(12) United States Patent
Lee

(10) Patent No.: US 6,481,553 B1
(45) Date of Patent: Nov. 19, 2002

(54) AUTOMATIC TRANSMISSION

(75) Inventor: Gung Cheol Lee, Fuji (JP)

(73) Assignee: Jatco Transtechnology Ltd. (JP)

( * ) Notice: Subject to any disclaimer, the term of this patent is extended or adjusted under 35 U.S.C. 154(b) by 47 days.

(21) Appl. No.: 09/687,733

(22) Filed: Oct. 13, 2000

(30) Foreign Application Priority Data

Oct. 20, 1999 (JP) ............................................ 11-297574

(51) Int. Cl.$^7$ ........................ F16D 13/10; F16D 13/02; F16H 57/02
(52) U.S. Cl. ...................... 192/70.2; 192/3.52; 475/346
(58) Field of Search .............................. 192/3.52, 70.2; 403/315, 316, 317, 359.1, 359.6; 475/176, 346; 464/182

(56) References Cited

U.S. PATENT DOCUMENTS

| | | | |
|---|---|---|---|
| 5,715,918 A | * | 2/1998 | Everett et al. ............ 192/48.92 |
| 5,716,298 A | * | 2/1998 | Beim et al. .................. 475/275 |
| 5,937,985 A | * | 8/1999 | Dover et al. ................ 192/70.2 |
| 6,024,197 A | * | 2/2000 | Suwa et al. ............... 192/48.92 |

* cited by examiner

Primary Examiner—Sherry Estremsky
Assistant Examiner—Eric M. Williams
(74) Attorney, Agent, or Firm—Rossi & Associates

(57) ABSTRACT

An automatic transmission formed so that the axial displacement of a clutch drum is restricted without causing an increase in the manufacturing cost and number of man-hour. A first spline is formed on an inner circumferential surface of a carrier of first planetary gear mechanism, and a second spline meshed with the first spline is formed on an outer circumferential surface of a free end section of a hub portion of a clutch drum of a clutch. The second spline is formed by cutting process, and has a diagonally cut rising portion at a terminal end thereof. When the clutch drum is displaced from its set position toward an intermediate partition wall by a predetermined amount, an inclined surface of the cut rising portion of the second spline on the hub portion engages a radially inner corner edge portion of the carrier.

4 Claims, 9 Drawing Sheets

Fig.2

| Gear Position | C1 | C2 | C3 | B1 | B2 | OWC |
|---|---|---|---|---|---|---|
| 1st | ○ | | | | | ● |
| 2nd | ○ | | | | ○ | |
| 3rd | ○ | ○ | | | | |
| 4th | ○ | | ○ | | | |
| 5th | | ○ | ○ | | | |
| 6th | | | ○ | | ○ | |
| Rev | | ○ | | ○ | | |

AUTOMATIC TRANSMISSION

BACKGROUND OF THE INVENTION

1. Field of the Invention

This invention relates to an automatic transmission provided with planetary gear mechanism and engaging elements, such as clutches, and achieving plural number of driving gear positions, and more particularly to a connecting structure between a clutch drum and its adjacent members.

2. Description of the Prior Art

In an automatic transmission mounted on a vehicle, planetary gear mechanism and plural clutches or brakes as engaging elements are combined with each other, and a plural number of gear positions are achieved by a combination of the engagement and disengagement of these clutches and brakes respectively.

Accordingly, in the automatic transmission, the planetary gear mechanisms and engaging elements having friction plates, and plural rotary members for connecting these members are provided adjacently to each other.

It is necessary that these adjacently provided parts display their normal functions, and that the positions of the parts be controlled by securing predetermined widths of clearances among these parts so that these parts do not contact one another.

To carry out such position control operations, thrust bearings for securing the relative rotations of the parts are provided, whereby such clearances as mentioned above are secured in many cases.

For example, even in a transmission disclosed in Japanese Patent Application Laid-Open No. 63-270967, a clutch drum 35 of a clutch device 26 is rotated unitarily with a turbine shaft 12, so that the clutch drum is connected to the turbine shaft 12 by the meshing thereof with a spline. In such a meshed structure, the clutch drum 35 is displaced in the axial direction. Therefore, in order to control an axial position of the clutch drum, a thrust bearing 40 is provided between the portion of the clutch drum and a connecting member 39, and also a thrust bearing is provided between the part of the clutch drum and an adjacent member in the vicinity of a meshed part thereof with the turbine shaft 12.

Besides such techniques, a displacement control method of fitting a snap ring in a drum member of the clutch drum, and holding a relative member by the snap ring is also employed in practice.

However, providing thrust bearings on both sides of the clutch drum so as to carry out an axial position control operation as mentioned above causes first the necessity of securing spaces for providing the thrust bearings to arise, and such techniques also cause an increase in the manufacturing cost and number of man-hour of assembling work to occur due to an increase in the number of parts.

Also, in the method of carrying out this position control operation using a snap ring, a groove in which the snap ring for holding a relative member is to be fitted is formed in addition to a meshing portion with a friction plate. Therefore, the clutch drum requires to have a predetermined axial length, and an increase in the number of parts occurs.

SUMMARY OF THE INVENTION

The present invention has been made in view of the above circumstances, and provides an automatic transmission formed so as to control the axial displacement of rotary members, such as a clutch drum, without causing an increase in the manufacturing cost and number of man-hour thereof, and, moreover, without increasing the dimensions thereof.

According to an aspect of the present invention, the automatic transmission is provided with planetary gear mechanism and a clutch, a clutch drum and an adjacent rotary member having a unitarily rotatably connected structure owing to the spline meshing thereof, whereby plural gear positions are achieved, a first spline formed on one of the clutch drum and rotary member having a diagonally cut rising portion, a corner edge portion of a second spline formed on the other of the clutch drum and rotary member engaging the diagonally cut rising portion when the clutch drum is displaced in the axial direction thereof by a predetermined amount, whereby the position of the clutch drum is controlled.

Thus, an operation for controlling the displacement of the clutch drum can be carried out without causing an increase in the axial size, which was encountered in a related art automatic transmission due to the provision of thrust bearings and snap ring therein, of the automatic transmission according to the present invention, and without causing an increase in the part manufacturing cost and number of man-hour.

Especially, when the rotary member is a carrier supporting a pinion of the planetary gear mechanism, it is possible to form the second spline on an inner circumferential surface thereof, and form the first spline on an outer circumferential surface of an end portion of a hub portion of the clutch drum.

When the clutch drum is displaced toward the planetary gear mechanism, the diagonally cut rising portion of the first spline on the outer circumferential surface of the hub portion engages the corner edge portion of the second spline on the inner circumferential surface of the carrier to thereby restrict the displacement of the clutch drum.

Since the diagonally cut rising portion is formed in a step attendant to a process for the formation of the spline, a special process is not required.

When a groove for fitting a snap ring therein is formed in the section of the hub portion of the clutch drum, the length of the hub portion can be reduced by locating the groove at a position adjacent to a radially outer end of an inclined surface of the diagonally cut rising portion of the first spline, so that the overall axial length of the automatic transmission can be reduced.

BRIEF DESCRIPTION OF THE DRAWINGS

A preferred embodiment of the present invention will be described in detail on the basis of the following figures, wherein:

FIG. 2 is a table showing operational combinations of engaging elements for changing gear positions;

DETAILED DESCRIPTION OF THE PREFERRED EMBODIMENTS

Preferred embodiments of the present invention will be described hereinbelow.

This embodiment is applied to an automatic transmission that is capable of changing gear positions at six positions in forward driving and one position in backward driving.

Figure 1:
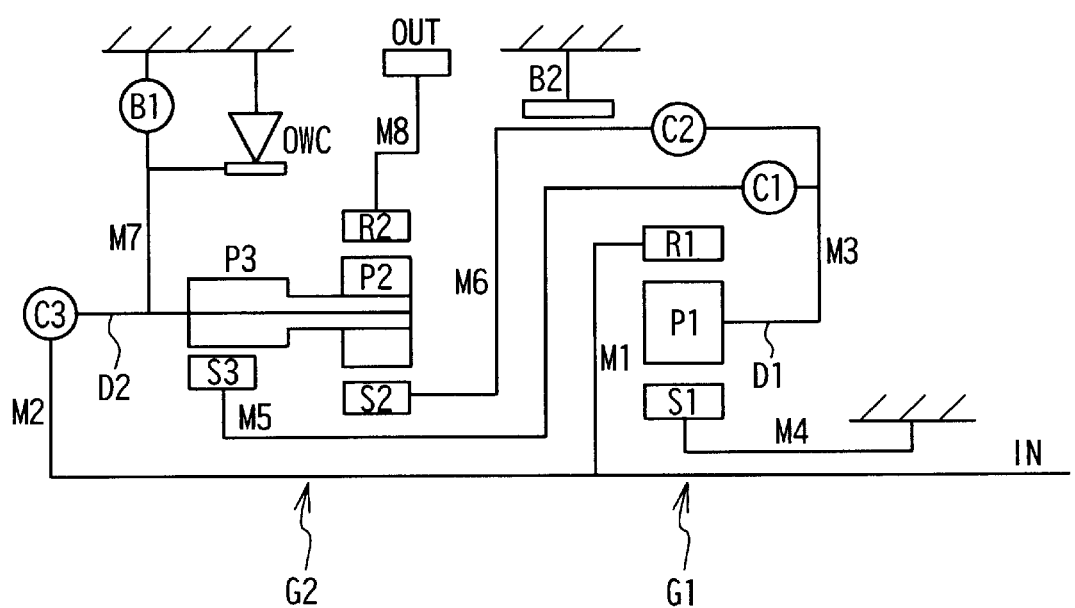
FIG. 1 is a schematic diagram showing a power transmission mechanism of an automatic transmission according to a preferred embodiment of the present invention.

FIG. 1 is a schematic diagram showing a transmission mechanism according to the embodiment of the present invention. Along an axis of an input shaft IN supported in a transmission case, a first planetary gear mechanism G1 and a second planetary gear mechanism G2 are arranged in that order from an input side connected to a torque converter. The members are arranged symmetrically with respect to the axis, and thus, the lower half of the axis is not illustrated in FIG. 1.

The first planetary gear mechanism G1 is a single pinion type, and the second planetary gear mechanism G2 is a ravineaux type. Both planetary gear mechanisms have well-known structures. The first planetary gear mechanism G1 comprises a sun gear S1, a first pinion P1, a first carrier D1 and a first ring gear R1. The first pinion P1, which is rotatably supported by the first carrier, is located between the first sun gear S1 and the first ring gear R1. The first pinion P1 is engaged with the first sun gear S1 and the first ring gear R1. The second planetary gear mechanism G2 comprises a second sun gear S2, a third sun gear S3, a second pinion P2, a third pinion P3, a second carrier D2 and a second ring gear R2.

The second pinion P2 and the third pinion P3 are rotatably supported by the second carrier D2. The second pinion P2 and the third pinion P3 are engaged with one another. The second pinion P2 is located between the second sun gear S2 and the second ring gear R2. The second pinion P2 is engaged with the second sun gear S2 and the second ring gear R2. The third pinion P3 is engaged with the third sun gear S3.

The input shaft IN is integrally connected to the first ring gear R1 of the first planetary gear mechanism G1 through a first rotary member M1. The input shaft IN is connectable to the second carrier D2 of the second planetary gear mechanism via a third clutch C3 through a second rotary member M2.

The first sun gear S1 of the first planetary gear mechanism G1 is fixed in the transmission case through a fourth member M4.

The first carrier D1 is connectable to the third sun gear S2 of the second planetary gear mechanism G2 via a third rotary member M3, a first clutch C1 and a fifth rotary member M5 in that order.

The second sun gear S2 of the second planetary gear mechanism G2 is connectable to the third rotary member M3 via a second clutch C2 through a sixth rotary member M6. The sixth rotary member M6 can be fixed to the transmission case through the second brake B2.

A seventh rotary member M7 is integrally connected to the second carrier D2 of the second planetary gear mechanism G2. The seventh rotary member M7 can be fixed to the transmission case through a first brake B1 and a one-way clutch OWC arranged in parallel. With a rotational input in a reverse direction to the rotating direction of the input shaft IN, the one-way clutch OWC is engaged, i.e., fixes the seventh rotary member M7.

An output gear OUT is integrally connected to the second ring gear R2 of the second planetary gear mechanism G2 through an eighth rotary member M8.

In the above structure, the engagement of two elements among the first through third clutches C1–C3; the first and second brakes B1, B2; and the one-way clutch OWC achieves six gear positions in forward driving and one gear position(Rev.) in backward driving as shown in FIG. 2. In FIG. 2, circles indicate the engaged elements.

An outline of the transmission operation will now be given hereinbelow.

Figure 3A:
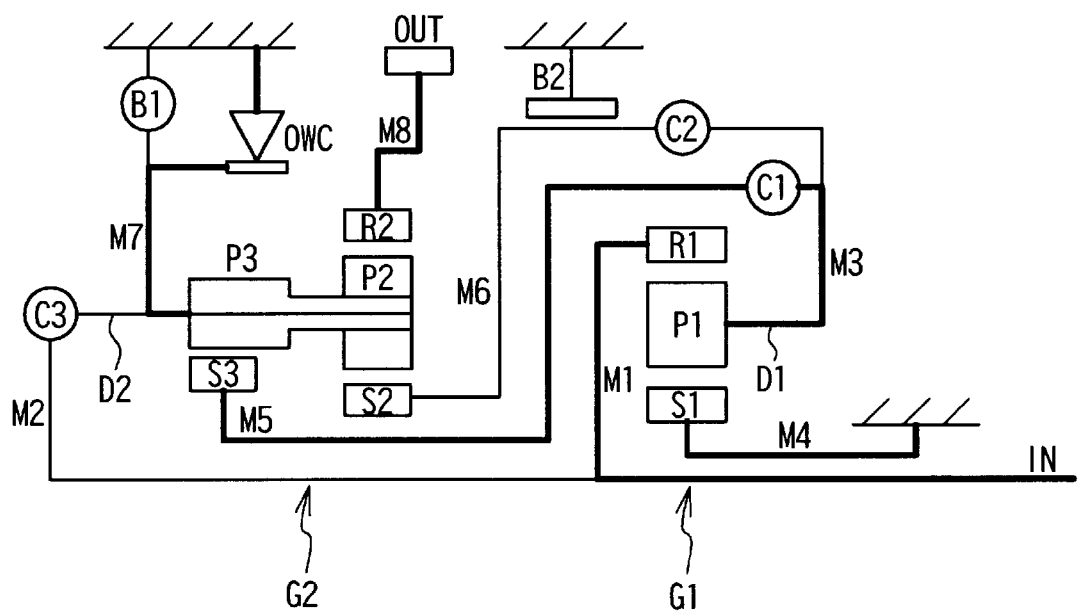
FIG. 3A is a view showing the transmission state of a power transmission mechanism in the case where a forward driving first speed gear position is selected.

For a selection of the first speed gear position in forward driving, the first clutch C1 is engaged as shown in FIG. 3A. In FIG. 3A, the operating engaging elements and rotary members are indicated by thick solid lines. This applies to the other drawings.

The rotation of the input shaft IN inputted to the first ring gear R1 of the first planetary gear mechanism G1 via the first rotary member M1 is reduced and outputted to the first carrier D1, and the rotation is transmitted to the third sun gear S3 of the second planetary gear mechanism G2 via the first clutch (and the third and fifth rotary members M3 and M5).

The one-way clutch OWC prevents the reverse rotation of the second carrier D2 of the second planetary gear mechanism G2 through the seventh rotary member M7, and thus, the second planetary gear mechanism G2 reduces the speed of the second ring gear R2 with respect to the rotation of the third sun gear S3. This achieves the first speed at the output gear OUT integrated with the second ring gear R2.

Figure 3B:
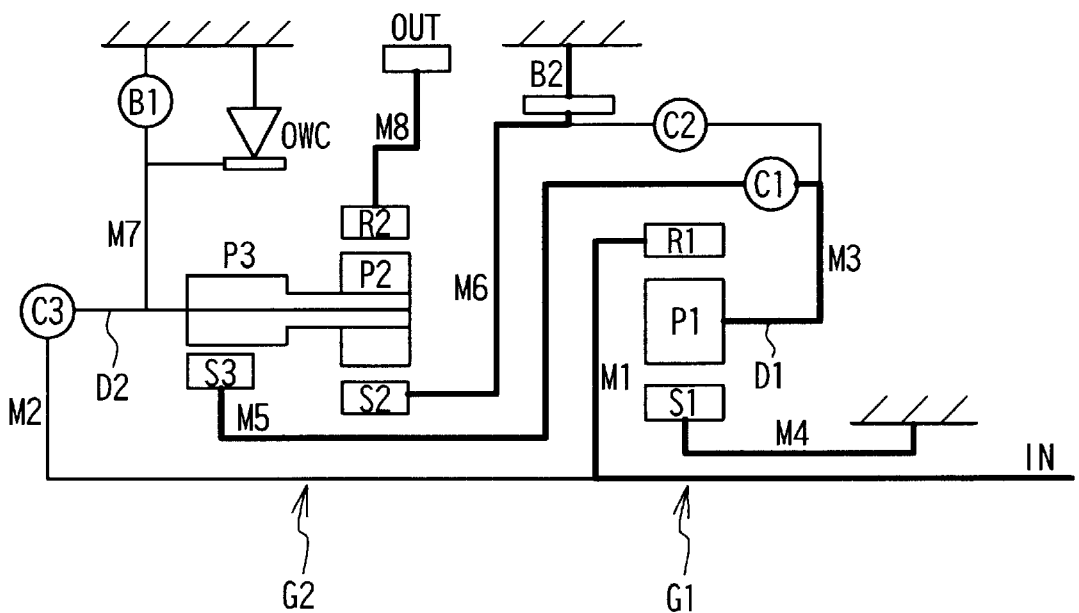
FIG. 3B is a view showing the transmission state of a power transmission mechanism in the case where a forward driving second speed position is selected.

For a selection of the second speed gear position in forward driving, the second brake B2 is additionally engaged in the state of the first speed gear position as shown in FIG. 3B. Therefore, the rotation of the input shaft IN is transmitted to the third sun gear S3 of the second planetary gear mechanism G2 as is the case with the first speed gear position, and the engagement of the second brake B2 fixes the second sun gear S2 through the sixth rotary member M6. The second pinion P2 is rolling on the fixed second sun gear S2. This achieves the second speed, which is higher than the first speed, at the output gear OUT integrated with the second ring gear R2.

Figure 4A:
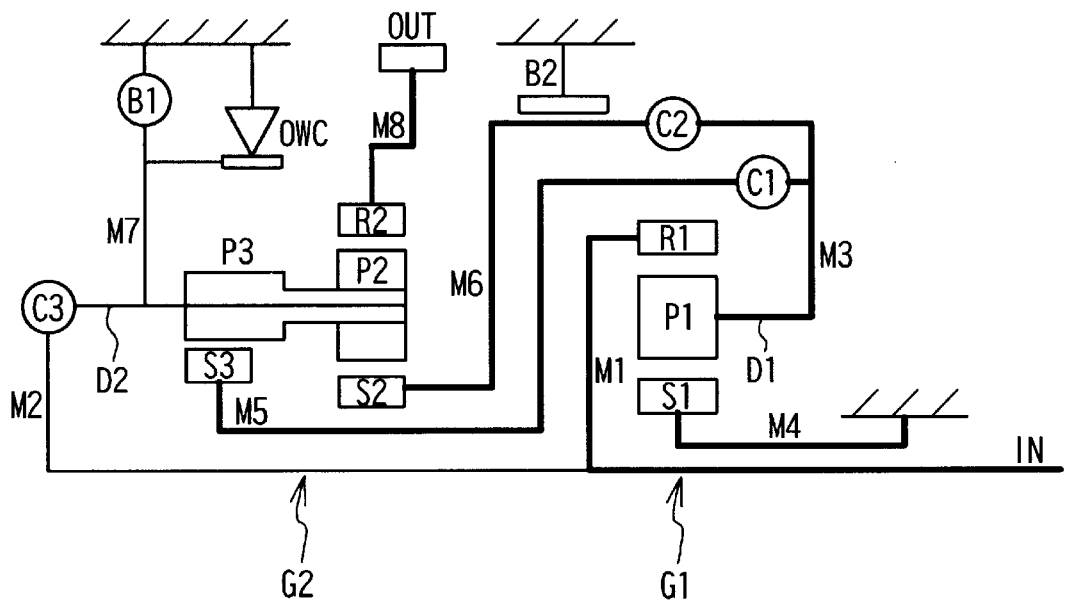
FIG. 4A is a view showing the transmission state of a power transmission mechanism in the case where a forward driving third speed gear position is selected.

For a selection of the third speed gear position in forward driving, the second brake B2 is disengaged in the state of the second speed gear position, and the second clutch C2 is engaged as shown in FIG. 4A. The fifth rotary member M5, the sixth rotary member M6 are connected to the third rotary member M3 via the first clutch C1 and the second clutch C2, respectively. In the second planetary gear mechanism G2, the second sun gear S2 and the third sun gear S3 are rotated integrally with each other.

This locks the second pinion P2 and the third pinion P3, and achieves the third speed at which the output gear OUT integrated with the second ring gear R2 rotates at the same speed as the first carrier (the second sun gear S2 and the third sun gear S3) of the first planetary gear mechanism G1.

Figure 4B:
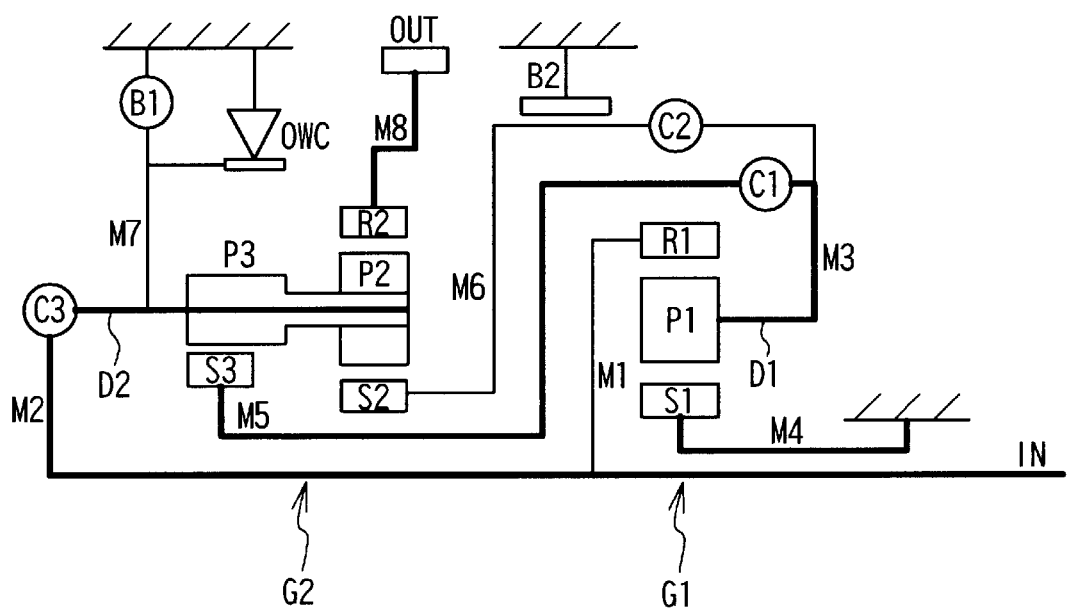
FIG. 4B is a view showing the transmission state of a power transmission mechanism in the case where a forward driving fourth speed gear position is selected.

For a selection of the fourth speed gear position in forward driving, the second clutch C2 is disengaged in the state of the third speed gear position, and the third clutch C3 is engaged as shown in FIG. 4B. Therefore, the second carrier D2 of the second planetary gear mechanism G2 is rotated in the same direction as the input shaft IN through the second rotary member M2 whereas the speed of the third sun gear S3 of the second planetary gear mechanism G2 is reduced with respect to the rotation of the input shaft via the first planetary gear mechanism G1.

Thus, the rotating direction of the second pinion P2 is in a direction to force the second ring gear R2 in a reverse direction, and the second ring gear R2 is rotated at a higher speed than the third sungear S3. This achieves the fourth speed at the output gear OUT, which is higher than the rotating speed of the first carrier D1 of the first planetary gear mechanism G1.

Figure 5A:
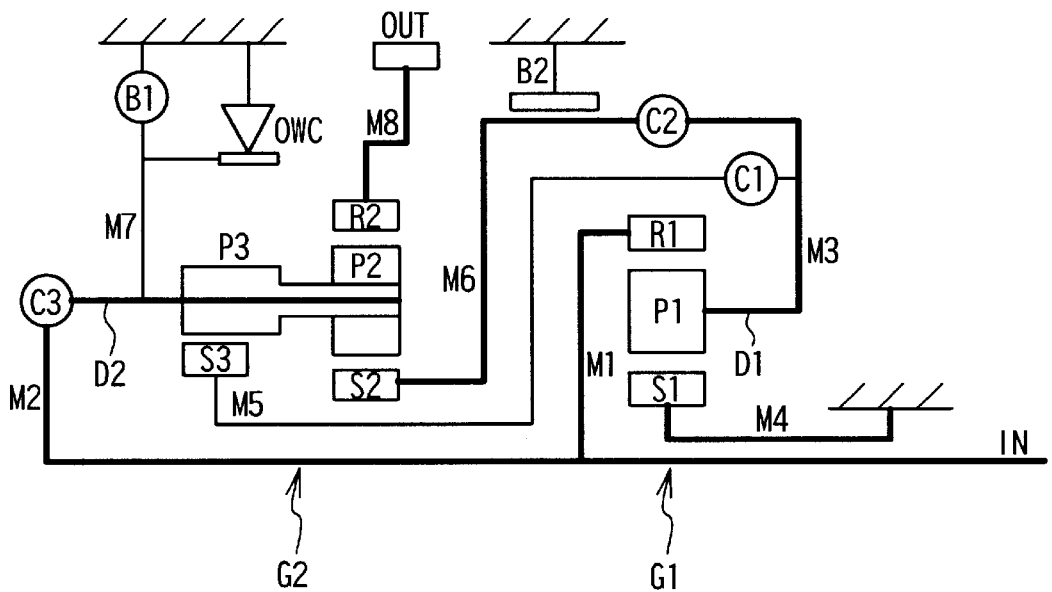
FIG. 5A is a view showing the transmission state of a power transmission mechanism in the case where a forward driving fifth speed gear position is selected.

For a selection of the fifth speed gear position in forward driving, the first clutch C1 is disengaged in the state of the fourth speed gear position, and the second clutch C2 is engaged as shown in FIG. 5A. The second carrier D2 of the second planetary gear mechanism G2 is rotated at the same speed as the input shaft IN while the rotation of the first carrier D1, the rotation speed of which is reduced with respect to the rotation of the input shaft in the first planetary gear mechanism G1, is transmitted to the second sun gear S2 of the second planetary gear mechanism G2 through the second clutch C2. Consequently, the second pinion P2, which is rolling on the second sun gear S2 in the same direction as the second sun gear S2 in the second planetary gear mechanism G2, rotates in such a direction as to increase the speed of the second ring gear R2, and this achieves the fifth speed at the output gear OUT, which is higher than the fourth speed.

Figure 5B:
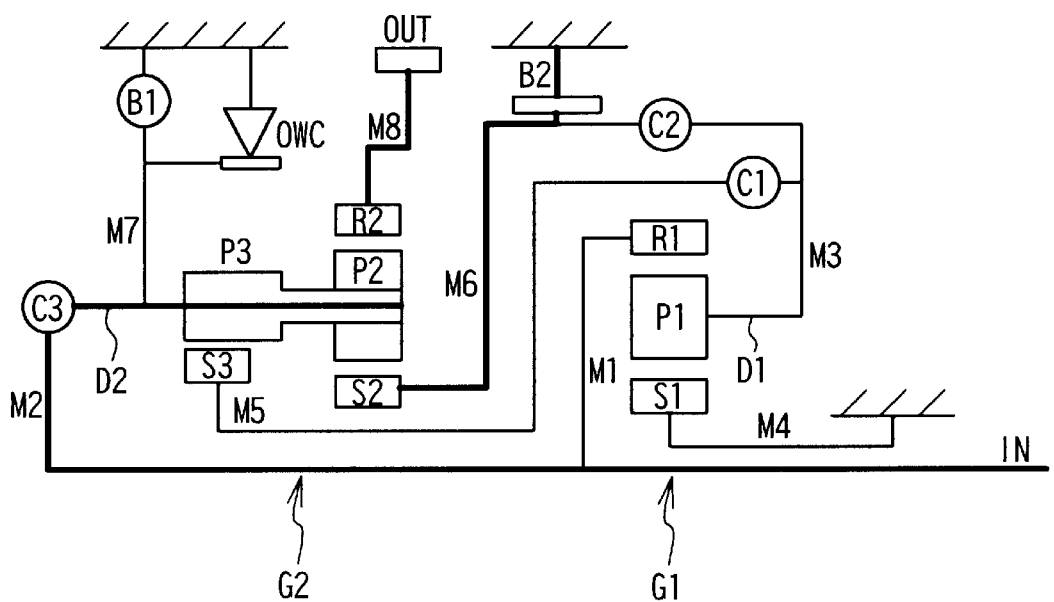
FIG. 5B is a view showing the transmission state of a power transmission mechanism in the case where a forward driving sixth speed gear position is selected.

For a selection of the sixth speed gear position in forward driving, the second clutch C2 is disengaged in the state of the fifth speed gear position, and the second brake B2 is engaged as shown in FIG. 5B. In this case, the second brake B2 fixes the second sun gear S2 whereas the second carrier D2 of the second planetary gear mechanism G2 is rotated at the same speed as the input shaft IN. Therefore, the second pinion P2 on the second carrier D2 is rotated at a higher speed than the fifth speed. This achieves the sixth speed at the output gear OUT integrated with the second ring gear R2, and the sixth speed is higher than the fifth speed.

Figure 6:
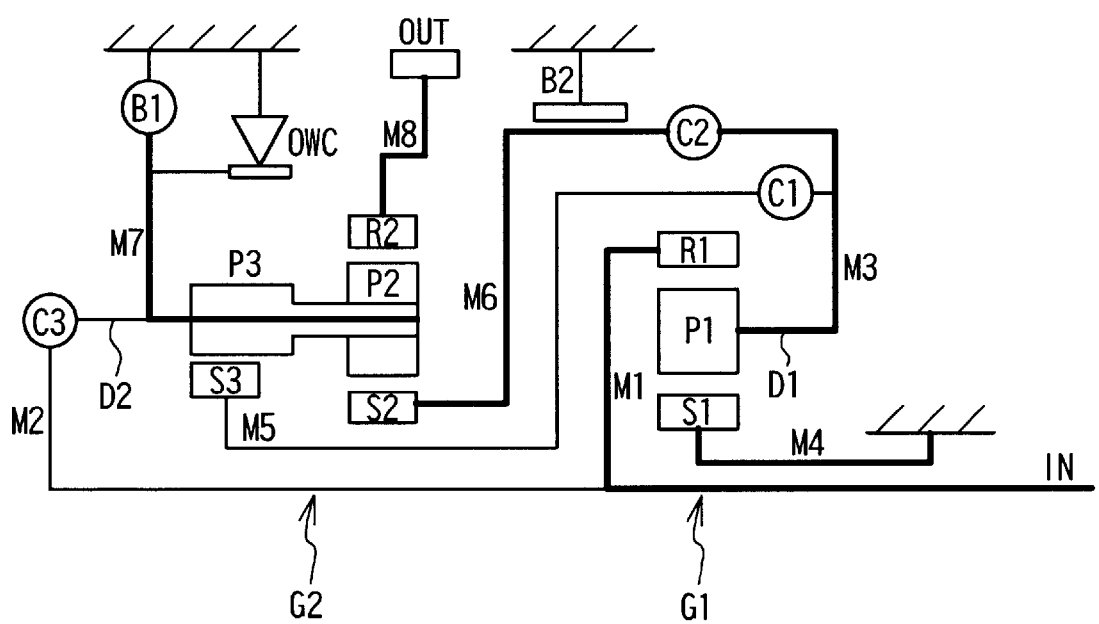
FIG. 6 is a view showing the transmission state of a power transmission mechanism in the case where a backward driving gear position is selected.

For a selection of the gear position in backward driving, the second clutch C2 and the first brake B1 are engaged as shown in FIG. 6. The rotation of the first carrier D1, the rotation speed of which is reduced with respect to the rotation of the input shaft in the first planetary gear mechanism G1, is transmitted to the second sun gear S2 of the second planetary gear mechanism G2 via the second clutch C2. On the other hand, the second carrier D2 supporting the second pinion P2 is fixed by the first brake B1 through the seventh rotary member M7. Consequently, the ring gear R2 of the second planetary gear mechanism G2 is rotated in a reverse direction with respect to the second sun gear S2. This achieves the gear speed in backward driving at the output gear OUT. The gear ratios of the sun gears, the ring gears and the like in the planetary gear mechanisms are determined so that gear ratios of the gear positions can be allocated in the optimum way according to the characteristics of the vehicle and the like.

Figure 7:
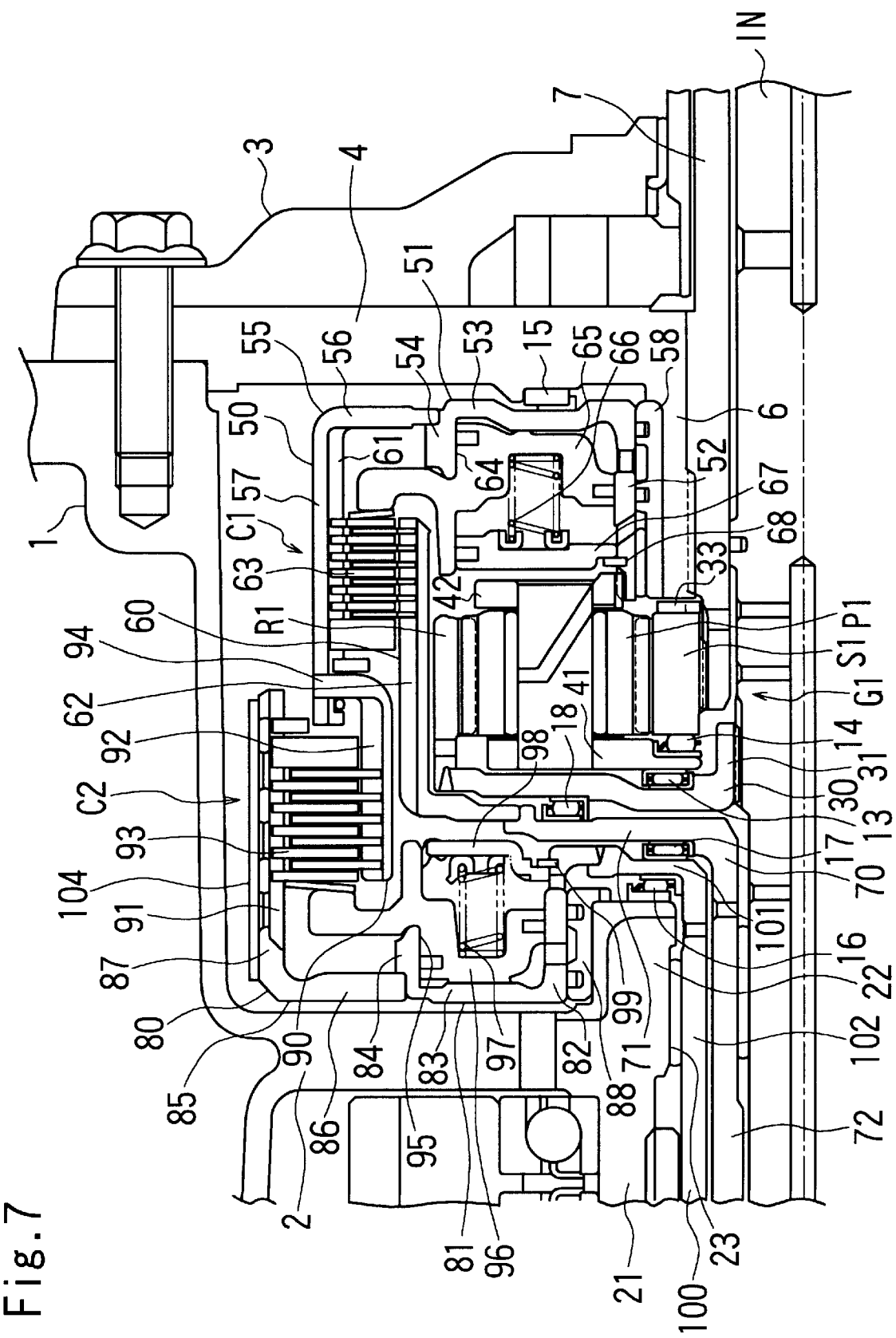
FIG. 7 is a sectional view showing the arrangement and construction of first planetary gear mechanism and parts around a first clutch in the embodiment.

FIG. 7 is a sectional view showing a concrete construction of the first planetary gear mechanism G1 and the parts around the first clutch C1.

An oil pump case 3 and a pump cover 4 are fixed to the portion of the transmission case 1 which is on the side of a torque converter to form a fixed side partition wall of the transmission case 1, and an intermediate partition wall 2 integral with the transmission case 1 is provided with a predetermined distance spaced from this fixed side partition wall.

A projecting cylinder 6 extends from the pump cover 4, and a stator shaft 7 supporting the input shaft IN is fixed through this projecting cylinder 6.

The first planetary gear mechanism G1 is provided in a position which is in the axial direction from the pump cover 4 toward the intermediate partition wall 2, and which is opposed to an end portion of the stator shaft 7, and the first sun gear S1 in the same planetary gear mechanism is spline-connected to a free end portion of the stator shaft 7.

In a space defined by the pump cover 4 and the intermediate partition wall 2, the first clutch C1 is provided between the first planetary gear mechanism G1 and the pump cover 4, and the second clutch C2 is provided on the opposite side of the first clutch C 1 with the first planetary gear mechanism G1 located therebetween.

The first ring gear R1 of the first planetary gear mechanism G1 is connected by welding with an outer circumferential edge of a disc member 30 provided with a cylindrical portion 31 at a central part thereof, and the cylindrical portion 31 is spline-connected to the input shaft IN. A free end of the cylindrical portion 31 is opposed to an end portion of the stator shaft 7. The first pinion P1 is supported on carrier A 41 and carrier B 42 which constitute the first carrier D1.

The disc member 30 corresponds to the first rotary member M1, and also the stator shaft 7 corresponds to the fourth member M4.

Thrust bearings 13, 14 are provided between the disc member 30 and carrier A 41, and between the carrier A 41 and first sun gear S1 respectively. A thrust washer 33 is provided between the first sun gear S1 and an end surface of the projecting cylindrical portion 6 of the pump cover 4.

The clutch drum 50 of the first clutch C1 is formed of an inner member 51 including a hub portion 52 as an inner cylinder, a disc portion 53 extending from the hub portion in the outward direction, and an outer cylinder 54 extending from the disc portion; and an outer member 55 including a vertical wall 56 joined to the disc portion 53 of the inner member 51 and extending further in the outward direction, and a drum portion 57 extending from the vertical wall, the hub portion 52 being supported on the projecting cylinder 6 of the pump cover 4 via a sleeve 58. A thrust bearing 15 is provided between the disc portion 53 and pump cover 4.

The drum portion 57 extends toward the first planetary gear mechanism G1. A hub 60 is provided inside of the drum portion 57 so as to be opposed thereto, and plural friction plates 63 are meshed alternately with splines 61, 62 formed on an inner circumference of the drum portion 57 and an outer circumference of the hub 60.

The inner member 51 of the clutch drum 50 is provided with a ring-shaped cylinder 64 between an outer circumferential surface of the hub portion 52 and an inner circumferential surface of the outer cylinder 54, and a piston 65 is made able to be moved axially to press the friction plates 63. A spring seat 67 is fixed by a snap ring 68 to the outer circumference of the hub portion 52, and a return spring 66 is provided between the piston 65 and spring seat 67.

The hub 60 of the first clutch C1 extends outside of the first planetary gear mechanism G1, and is joined to a disc portion 71 of a rotary member 70. The rotary member 70 is connected to the third sun gear S3 of the second planetary gear mechanism G2 (not shown) by a cylindrical portion 72 supported on the input shaft IN and extending in the axial direction. This rotary member 70 corresponds to the fifth rotary member.

A clutch drum 80 of the second clutch C2 is formed of an inner member 81 including a hub portion 82 as an inner cylinder, a disc portion 83 extending from the hub portion in the outward direction, and an outer cylinder 84 extending from the disc portion; and an outer member 85 including a vertical wall 86 welded to the disc portion 83 of the inner member 81 and extending further in the outward direction, and a drum portion 87 joined to the vertical wall 86.

The intermediate partition wall 2 is provided with projecting portions 21, 22 extending from both sides thereof in the opposite axial directions, and the input shaft IN extends through an axial bore 23 formed in the projecting portions 21, 22.

The hub portion 82 of the clutch drum 80 is supported on the projecting portion 22 via a sleeve 88.

A hub 90 is provided inside of the drum portion 87 so as to be opposed thereto, and plural friction plates 93 are meshed with splines 91, 92 formed on an inner circumference of the drum portion 87 and an outer circumference of the hub 90.

The hub 90 extends outside of the hub 60 of the first clutch C1, and has an outwardly extending rising portion 94 at an end section thereof. This rising portion 94 is engaged with an end section of the drum portion 57 of the clutch drum 50 of the first clutch, and the hub 90 of the second clutch C2 is rotated unitarily with the clutch drum 50 of the first clutch.

The inner member 81 of the clutch drum 80 is provided with a ring-shaped cylinder 95 between an outer circumferential surface of the hub portion 82 and an inner circumferential surface of the outer cylinder 84, and a piston 96 is made able to be moved axially to press the friction plates 93. A spring seat 98 is fixed by a snap ring 99 to the outer circumference of the hub portion 82, and a return spring 97 is provided between the piston 96 and spring seat 98.

The hub portion 82 of the clutch drum 80 is joined to a disc portion 101 of a rotary member 100. The rotary member 100 is supported on the rotary member 70 extending along the input shaft IN, and connected to the second sun gear S2 of the second planetary gear mechanism G2 (not shown) by an axially extending cylindrical portion 102. The rotary member 100 corresponds to the sixth rotary member.

A brake band 104 constituting the second brake B2 is provided on an outer circumferential surface of the drum portion 87 of the clutch drum 80 so that the brake band can be engaged therewith.

A thrust bearing 16 is provided between an end surface of the projecting portion 22 of the intermediate partition wall 2 and the disc portion 101 of the rotary member 100, thrust bearings 17, 18 being also provided between the disc portion 101 and the disc portion 71 of the rotary member 70 and between the disc portion 71 and disc member 30 respectively.

A carrier B 42 in the first planetary gear mechanism GI is joined to the hub portion 52 of the clutch drum 50 by spline connection.

Figure 8:
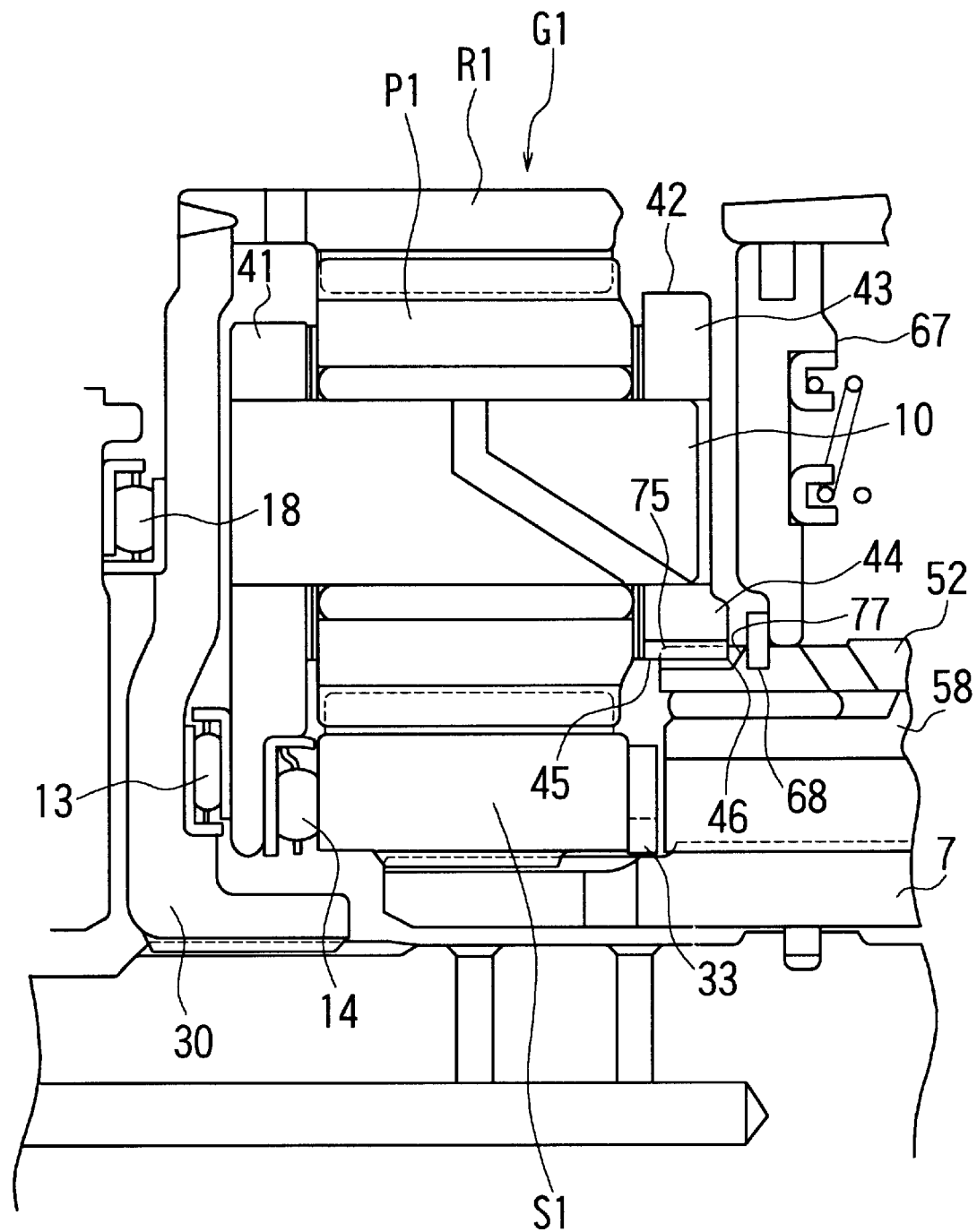
FIG. 8 is an enlarged view showing the details of a portion at which a carrier in the first planetary gear mechanism and a hub portion of a clutch drum of the first clutch are connected with each other.

FIG. 8 is an enlarged view showing the details of a connecting section of the carrier B 42 and hub portion 52.

A radially inner portion 44 of the carrier B 42 is set to an axial length larger than a thickness of a shaft support portion 43 supporting a pinion shaft 10, and provided with a spline 45 on an inner circumferential surface thereof. The hub portion 52 of the clutch drum 50 is provided on an outer circumferential surface of a free end section thereof with a spline 75 meshed with the spline 45.

The spline 75 of the hub portion 52 is formed by pressing the free end section, which is formed by substantially extending a part of the hub portion as it is to which the snap ring 68 for holding the spring seat 67 is fixed, of the hub portion, and the spline has at its terminal end a diagonally cut rising portion 77 having an inclined surface.

When the clutch drum 50 is displaced from its set position toward the intermediate partition wall 2 by a predetermined amount, the diagonally cut rising portion 77 of the spline of the hub portion 52 engages the corner edge portion 46 of the radially inner portion 44 of the carrier B.

Since the displacement of the carrier B 42 toward the intermediate partition wall 2 is restricted by the thrust bearings 13, 18, 17, 16 via the pinion shaft 10 and carrier A 41, the displacement of the clutch drum 50 toward the intermediate partition wall 2 is suitably limited.

Since the corner edge portion 46 of the carrier B comes into contact with the inclined surface of the diagonally cut rising portion 77 of the spline, the bending stress occurring in the hub portion 52 at the time of this engagement is lowered as compared with that occurring therein when the corner edge portion comes into contact with a vertical surface.

The displacement of the clutch drum 50 toward the pump cover 4 is restricted by the thrust bearing 15.

The restriction of the displacement of the carrier B 42 toward the pump cover 4 is done by the carrier A 41, a thrust bearing 14, the first sun gear S1, and a thrust washer 33 contacting an end surface of the projecting cylinder 6.

The spline-connected portion of the radially inner portion 44 of the carrier B 42 and the hub portion 52 corresponds to the third rotary member.

In many gear positions, a driving force is transmitted as an input into the first ring gear R1 and as an output from the carrier B 42 to the clutch drum 50 via the splines 45, 75. Accordingly, the rotational speed of the clutch drum 50 becomes lower than that of the engine, and the clutch drum becomes hard to be burst.

Figure 9:
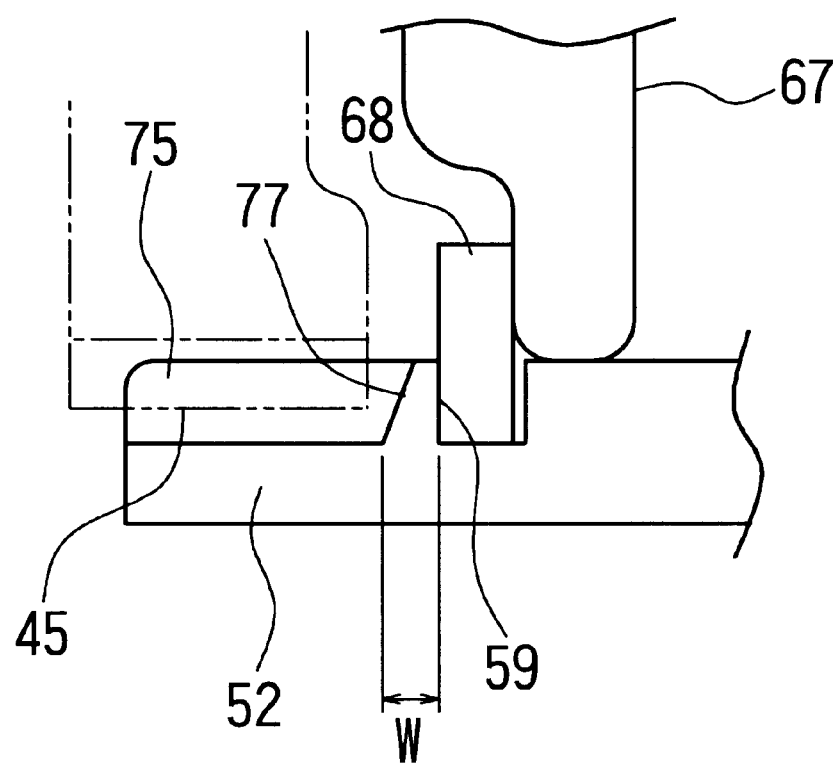
FIG. 9 is an enlarged view showing a spline on a hub portion of a clutch drum and a groove for a snap ring.

In this embodiment, in the part of the free end section of the hub portion 52, a groove 59 for fitting the snap ring 68 therein is formed very close to a terminal end of the inclined surface of the diagonally cut rising portion 77 as shown on a further enlarged scale in FIG. 9.

The diagonally cut rising portion 77 forms an inclined surface in this embodiment, so that a distance W between a bottom portion of the ring fitting groove 59 and a valley portion of the spline 75 is long. Therefore, even if an edge of the ring fitting groove 59 and the terminal end of the cut rising portion are close to each other, the snap ring 68 can be retained reliably even when the snap ring 68 receives a large force from the spring seat 67, and a crack does not occur in the bottom portion of the ring fitting groove 59.

As explained above, in this embodiment the automatic transmission with the carrier B 42 of the pinion P1 of the first planetary gear mechanism G1 and clutch drum 50 spline-connected together is provided with the spline 75 formed on the hub portion 52 of the clutch drum and having the diagonally cut rising portion 77, which is adapted to come into contact with the radially inner portion 44, on which the spline of the carrier B 42 is formed, when the clutch drum 50 and carrier B 42 are relatively displaced. Therefore, the displacement of the clutch drum 50 can be restricted without providing a thrust bearing, which directly contacts the clutch drum, in at least one axial end portion thereof.

Since the cut rising portion is formed in a step attendant to a process for the formation of the spline, a special process is not required, and the part manufacturing cost and the number of man-hour decrease.

Since the groove 59 for the snap ring 68 can be formed very close to the terminal end of the inclined surface of the diagonally cut rising portion 77, the length of the hub portion 52 of the clutch drum can be reduced, so that an overall axial length of the automatic transmission can be reduced.

In this embodiment, the present invention is applied to the connecting portion of the carrier of the first planetary gear mechanism G1 and the clutch drum of the first clutch C1 in an automatic transmission having first and second planetary gear mechanisms G1, G2 and first, second and third clutches C1, C2, C3, and adapted to obtain six forward driving gear positions, but the present invention is not limited to this embodiment. The present invention can be applied to a structure between various kinds of adjacent members to be spline-connected.

What is claimed is:

1. An automatic transmission having a plurality of gear positions, comprising:

a planetary gear mechanism having a pinion;

a clutch having a clutch drum provided with a hub portion; and a rotary member, wherein one of said clutch drum and said rotary member has a first spline with a diagonally cut rising portion, wherein the other of said clutch drum and rotary member has a second spline with a comer edge portion, the comer edge portion engaging said diagonally cut rising portion when said clutch drum is displaced in an axial direction thereof by a predetermined amount and restricting the displacement of the clutch drum, wherein said rotary member is a carrier supporting said pinion, and said second spline is formed on an inner circumferential surface of the carrier, and wherein said first spline is formed on an outer circumferential surface of an end section of said hub portion.

2. An automatic transmission having a plurality of gear positions, comprising:

a planetary gear mechanism provided with two carriers supporting a pinion at both axial side portions thereof;

a clutch having a clutch drum provided with a drum portion and a hub portion as an inner cylinder, said clutch drum being positioned axially adjacent to said planetary gear mechanism; and first and second adjacent members, wherein said hub portion has a first spline having a diagonally cut rising portion provided on an outer circumferential surface of an end section thereof, wherein said first adjacent member restricts the displacement in one axial direction of one of the carriers that is positioned farther away from said clutch drum, the displacement in the other axial direction of the one carrier being restricted by a sun gear in said planetary gear mechanism, wherein the one carrier has a second spline formed on an inner circumferential surface thereof, the second spline engaging with said first spline so that said one carrier rotates together with said clutch drum, wherein said second adjacent member restricts the displacement in one axial direction of said clutch drum, the displacement in the other axial direction thereof being restricted by said diagonally cut rising portion of said first spline engaging a corner edge portion of said second spline.

3. An automatic transmission according to claim 1 or 2, wherein said clutch drum is provided therein with a piston for pressing friction plates, and a return spring supported on a spring seat for urging the piston, and wherein said hub portion of said clutch drum has a groove, which is for receiving a snap ring for supporting said seat spring, formed adjacent to a terminal end of a radial outer side of said diagonally cut rising portion.

4. An automatic transmission having a plurality of gear positions, comprising:

a planetary gear mechanism having a pinion;

a clutch having a clutch drum provided with a hub portion; and a rotary member, wherein one of said clutch drum and said rotary member has a first spline with a diagonally cut rising portion, wherein the other of said clutch drum and rotary member has a second spline with a corner edge portion, the comer edge portion engaging said diagonally cut rising portion when said clutch drum is displaced in an axial direction thereof by a predetermined amount and restricting the displacement of the clutch drum, and wherein said clutch drum is provided therein with a piston for pressing friction plates, and a return spring supported on a spring seat for urging the piston, and wherein said hub portion of said clutch drum has a groove, which is for receiving a snap ring for supporting said seat spring, formed adjacent to a terminal end of a radial outer side of said diagonally cut rising portion.

* * * * *